(12) United States Patent
Dixon et al.

(10) Patent No.: US 8,712,892 B2
(45) Date of Patent: *Apr. 29, 2014

(54) VERIFICATION OF A PORTABLE CONSUMER DEVICE IN AN OFFLINE ENVIRONMENT

(71) Applicant: Visa U.S.A. Inc., San Francisco, CA (US)

(72) Inventors: Philip B. Dixon, San Diego, CA (US); Ayman Hammad, Pleasanton, CA (US); Khalid El-Awady, Mountain View, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,511

(22) Filed: Jan. 24, 2013

(65) Prior Publication Data

US 2013/0138565 A1    May 30, 2013

Related U.S. Application Data

(62) Division of application No. 11/680,592, filed on Feb. 28, 2007, now Pat. No. 8,386,349.

(51) Int. Cl.
*G06Q 40/00* (2012.01)

(52) U.S. Cl.
USPC ............... 705/35; 705/14; 705/21; 705/22; 705/38; 705/39; 705/44; 705/50; 705/67; 705/74; 705/75; 707/9; 709/203; 709/224; 701/117; 235/380; 235/381; 235/382; 235/383; 235/435; 235/492; 234/34; 340/10.41; 340/426.35; 340/572.7; 348/150; 379/91.02; 380/270; 194/205; 455/406

(58) Field of Classification Search
USPC ........... 705/14, 21, 22, 35, 38, 39, 44, 50, 67, 705/74, 75; 707/9; 709/203, 224; 701/117; 235/380, 381, 382, 383, 435, 492; 234/34; 340/10.41, 426.35, 572.7; 348/150; 379/91.02; 380/270; 194/205; 455/406
See application file for complete search history.

(56) References Cited

U.S. PATENT DOCUMENTS 2,328,654 A * 9/1943 Lake et al. .................. 234/34
3,008,635 A    11/1961 Sakalay
(Continued)

FOREIGN PATENT DOCUMENTS

CN    1436431 A    8/2008
EP    0 254 595 B1    1/1988
(Continued)

OTHER PUBLICATIONS

Chinese Office Action, with English Translation, mailed on Aug. 31, 2012, for CN Patent Application No. 200780043545.9, 13 pages.
(Continued)

*Primary Examiner* — Muhammad Shafi
*Assistant Examiner* — Sanjeev Malhotra
(74) *Attorney, Agent, or Firm* — Kilpatrick Townsend & Stockton

(57) ABSTRACT

A portable consumer device includes a base, and a computer readable medium on the base. The computer readable medium comprises code for an issuer verification value and a supplemental verification value. The issuer verification value is used by an issuer to verify that the portable consumer device is authentic in an on-line transaction and the supplemental verification value is used to verify that the portable consumer device is authentic in an off-line transaction.

23 Claims, 5 Drawing Sheets

(56) References Cited

U.S. PATENT DOCUMENTS

| | | |
|---|---|---|
| 4,303,904 A | 12/1981 | Chasek |
| 4,672,182 A | 6/1987 | Hirokawa |
| 4,736,094 A | 4/1988 | Yoshida |
| 4,822,985 A | 4/1989 | Boggan et al. |
| 4,851,650 A | 7/1989 | Kitade |
| 4,857,893 A | 8/1989 | Carroll |
| 4,870,259 A | 9/1989 | Boggan et al. |
| 4,899,036 A | 2/1990 | McCrindle et al. |
| 4,908,521 A | 3/1990 | Boggan et al. |
| 4,928,001 A | 5/1990 | Masada |
| 4,943,707 A | 7/1990 | Boggan |
| 5,103,079 A | 4/1992 | Barakai et al. |
| 5,191,193 A | 3/1993 | Le Roux |
| 5,286,955 A | 2/1994 | Klosa |
| 5,337,063 A | 8/1994 | Takahira |
| 5,360,967 A | 11/1994 | Perkin et al. |
| 5,396,558 A | 3/1995 | Ishiguro et al. |
| 5,477,038 A | 12/1995 | Levine et al. |
| 5,485,520 A * | 1/1996 | Chaum et al. ............. 705/74 |
| 5,500,513 A | 3/1996 | Langhans et al. |
| 5,503,774 A | 4/1996 | Brons et al. |
| 5,550,734 A | 8/1996 | Tarter et al. |
| 5,562,550 A | 10/1996 | Chartrand |
| 5,585,614 A | 12/1996 | VonBallmoos |
| 5,585,787 A | 12/1996 | Wallerstein |
| 5,649,118 A | 7/1997 | Carlisle et al. |
| 5,801,943 A * | 9/1998 | Nasburg ............. 701/117 |
| 5,828,044 A | 10/1998 | Jun et al. |
| 5,844,230 A | 12/1998 | Lalonde |
| 5,864,830 A | 1/1999 | Armetta et al. |
| 5,883,377 A | 3/1999 | Chapin, Jr. |
| 5,903,830 A | 5/1999 | Joao et al. |
| 5,917,965 A | 6/1999 | Cahill et al. |
| 5,929,428 A * | 7/1999 | Iijima ............. 235/492 |
| 5,946,669 A | 8/1999 | Polk |
| 5,953,710 A | 9/1999 | Fleming |
| 5,984,180 A | 11/1999 | Albrecht |
| 5,984,191 A | 11/1999 | Chapin, Jr. |
| 5,991,527 A | 11/1999 | Plint et al. |
| 5,991,749 A * | 11/1999 | Morrill, Jr. ............. 705/44 |
| 6,021,943 A | 2/2000 | Chastain |
| 6,038,597 A | 3/2000 | Van Wyngarden |
| 6,039,245 A | 3/2000 | Symonds et al. |
| 6,044,360 A | 3/2000 | Picciallo |
| 6,097,292 A * | 8/2000 | Kelly et al. ............. 340/572.7 |
| 6,101,477 A | 8/2000 | Hohle et al. |
| 6,105,009 A | 8/2000 | Cuervo |
| 6,119,107 A | 9/2000 | Polk |
| 6,138,917 A | 10/2000 | Chapin, Jr. |
| 6,176,425 B1 | 1/2001 | Harrison et al. |
| 6,179,205 B1 | 1/2001 | Sloan |
| 6,185,307 B1 * | 2/2001 | Johnson, Jr. ............. 380/270 |
| 6,199,762 B1 | 3/2001 | Hohle |
| 6,216,227 B1 | 4/2001 | Goldstein et al. |
| 6,402,029 B1 | 6/2002 | Gangi |
| 6,422,462 B1 | 7/2002 | Cohen |
| 6,453,335 B1 | 9/2002 | Kaufmann |
| 6,473,500 B1 | 10/2002 | Risafi et al. |
| 6,502,745 B1 | 1/2003 | Stimson et al. |
| 6,529,725 B1 | 3/2003 | Joao et al. |
| 6,549,912 B1 | 4/2003 | Chen |
| 6,577,229 B1 * | 6/2003 | Bonneau et al. ............. 340/10.41 |
| 6,587,835 B1 | 7/2003 | Treyz et al. |
| 6,609,655 B1 * | 8/2003 | Harrell ............. 235/380 |
| 6,615,189 B1 | 9/2003 | Phillips et al. |
| 6,615,190 B1 | 9/2003 | Slater |
| 6,629,591 B1 * | 10/2003 | Griswold et al. ............. 194/205 |
| 6,655,587 B2 * | 12/2003 | Andrews et al. ............. 235/383 |
| 6,685,088 B1 | 2/2004 | Royer et al. |
| 6,726,098 B2 | 4/2004 | Schilling |
| 6,729,549 B2 * | 5/2004 | Hamann et al. ............. 235/492 |
| 6,732,080 B1 | 5/2004 | Blants |
| 6,859,650 B1 | 2/2005 | Ritter |
| 6,892,187 B2 | 5/2005 | Phillips et al. |
| 6,915,277 B1 | 7/2005 | Manchester et al. |
| 6,934,689 B1 | 8/2005 | Ritter et al. |
| 6,938,821 B2 | 9/2005 | Gangi |
| 6,970,891 B1 | 11/2005 | Deo et al. |
| 7,054,838 B2 | 5/2006 | Sutton et al. |
| 7,083,087 B1 | 8/2006 | Gangi |
| 7,092,697 B1 * | 8/2006 | Kupsh et al. ............. 455/406 |
| 7,096,003 B2 | 8/2006 | Joao et al. |
| 7,114,179 B1 | 9/2006 | Ritter et al. |
| 7,130,828 B2 | 10/2006 | Phillips et al. |
| 7,163,145 B2 | 1/2007 | Cohagan et al. |
| 7,165,049 B2 | 1/2007 | Slater |
| 7,171,388 B2 | 1/2007 | Phillips et al. |
| 7,172,112 B2 | 2/2007 | Bonalle et al. |
| 7,174,314 B2 | 2/2007 | Phillips et al. |
| 7,174,315 B2 | 2/2007 | Phillips et al. |
| 7,174,316 B2 | 2/2007 | Phillips et al. |
| 7,174,317 B2 | 2/2007 | Phillips et al. |
| 7,209,757 B2 | 4/2007 | Naghian et al. |
| 7,225,155 B1 | 5/2007 | Polk |
| 7,268,667 B2 | 9/2007 | Beenau et al. |
| 7,268,668 B2 | 9/2007 | Beenau et al. |
| 7,317,823 B1 | 1/2008 | Price et al. |
| 7,360,699 B2 | 4/2008 | Cohagan et al. |
| 7,363,273 B2 | 4/2008 | Phillips et al. |
| 7,433,452 B2 | 10/2008 | Taylor et al. |
| 7,437,362 B1 * | 10/2008 | Ben-Natan ............. 707/9 |
| 7,447,662 B2 | 11/2008 | Gibson |
| 7,469,827 B2 | 12/2008 | Katragadda et al. |
| 7,506,804 B2 | 3/2009 | Zajkowski et al. |
| 7,527,208 B2 | 5/2009 | Hammad et al. |
| 7,529,563 B1 | 5/2009 | Pitroda |
| 7,594,611 B1 | 9/2009 | Arrington, III |
| 7,959,074 B1 | 6/2011 | Chopra et al. |
| 8,118,223 B2 | 2/2012 | Hammad et al. |
| 2001/0026679 A1 | 10/2001 | Koshino et al. |
| 2001/0033447 A1 | 10/2001 | Miles |
| 2001/0051920 A1 | 12/2001 | Joao et al. |
| 2001/0056536 A1 | 12/2001 | Everett et al. |
| 2002/0002534 A1 | 1/2002 | Davis et al. |
| 2002/0010603 A1 | 1/2002 | Doi et al. |
| 2002/0038336 A1 * | 3/2002 | Abileah et al. ............. 709/203 |
| 2002/0050528 A1 | 5/2002 | Everett et al. |
| 2002/0077122 A1 | 6/2002 | Yule |
| 2002/0103865 A1 | 8/2002 | Lilly |
| 2002/0111919 A1 * | 8/2002 | Weller et al. ............. 705/67 |
| 2002/0118118 A1 | 8/2002 | Myllymaki et al. |
| 2002/0145984 A1 | 10/2002 | Babu et al. |
| 2002/0152123 A1 * | 10/2002 | Giordano et al. ............. 705/14 |
| 2002/0152163 A1 | 10/2002 | Bezos et al. |
| 2002/0156807 A1 | 10/2002 | Dieberger |
| 2002/0163884 A1 | 11/2002 | Peles et al. |
| 2002/0194138 A1 | 12/2002 | Dominguez et al. |
| 2003/0028814 A1 | 2/2003 | Carta et al. |
| 2003/0050087 A1 | 3/2003 | Kwon |
| 2003/0050906 A1 | 3/2003 | Clifton-Bligh |
| 2003/0053609 A1 | 3/2003 | Risafi et al. |
| 2003/0061111 A1 | 3/2003 | Dutta et al. |
| 2003/0083944 A1 * | 5/2003 | Duvall et al. ............. 705/21 |
| 2003/0105711 A1 | 6/2003 | O'Neil |
| 2003/0135487 A1 | 7/2003 | Beyer et al. |
| 2003/0137435 A1 | 7/2003 | Haddad et al. |
| 2003/0144894 A1 | 7/2003 | Robertson et al. |
| 2003/0153330 A1 | 8/2003 | Naghian et al. |
| 2003/0174839 A1 | 9/2003 | Yamagata et al. |
| 2003/0181845 A1 | 9/2003 | Orton |
| 2003/0216927 A1 | 11/2003 | Sridhar et al. |
| 2003/0221195 A1 | 11/2003 | Bizet |
| 2004/0000585 A1 | 1/2004 | Silverbrook et al. |
| 2004/0006536 A1 | 1/2004 | Kawashima et al. |
| 2004/0016801 A1 | 1/2004 | Newsome et al. |
| 2004/0039686 A1 * | 2/2004 | Klebanoff ............. 705/38 |
| 2004/0117300 A1 | 6/2004 | Jones et al. |
| 2004/0139021 A1 | 7/2004 | Reed |
| 2004/0155960 A1 * | 8/2004 | Wren et al. ............. 348/150 |
| 2004/0256455 A1 | 12/2004 | Fukushima et al. |
| 2005/0018574 A1 | 1/2005 | Jenkins et al. |
| 2005/0036391 A1 | 2/2005 | Tomiie et al. |
| 2005/0053211 A1 | 3/2005 | Bevente et al. |
| 2005/0086160 A1 * | 4/2005 | Wong et al. ............. 705/39 |

(56) References Cited

U.S. PATENT DOCUMENTS

| | | | |
|---|---|---|---|
| 2005/0103839 A1* | 5/2005 | Hewel | 235/380 |
| 2005/0127168 A1 | 6/2005 | Phillips et al. | |
| 2005/0165695 A1 | 7/2005 | Berardi et al. | |
| 2005/0173518 A1 | 8/2005 | Takayama | |
| 2005/0185774 A1* | 8/2005 | Grear et al. | 379/91.02 |
| 2005/0203842 A1 | 9/2005 | Sanchez et al. | |
| 2005/0234778 A1* | 10/2005 | Sperduti et al. | 705/22 |
| 2005/0240743 A1 | 10/2005 | Eng et al. | |
| 2005/0269417 A1 | 12/2005 | Wood | |
| 2006/0000891 A1 | 1/2006 | Bonalle et al. | |
| 2006/0100933 A1 | 5/2006 | Fujita et al. | |
| 2006/0106650 A1 | 5/2006 | Bush | |
| 2006/0161435 A1 | 7/2006 | Atef et al. | |
| 2006/0240862 A1 | 10/2006 | Neven et al. | |
| 2006/0258337 A1 | 11/2006 | Fujita et al. | |
| 2006/0278704 A1* | 12/2006 | Saunders et al. | 235/382 |
| 2006/0282528 A1* | 12/2006 | Madams et al. | 709/224 |
| 2006/0287964 A1 | 12/2006 | Brown | |
| 2007/0023504 A1 | 2/2007 | Blankenship et al. | |
| 2007/0045403 A1 | 3/2007 | Slonecker, Jr. | |
| 2007/0051797 A1* | 3/2007 | Randolph-Wall et al. | 235/381 |
| 2007/0075140 A1* | 4/2007 | Guez et al. | 235/435 |
| 2007/0076872 A1 | 4/2007 | Juneau | |
| 2007/0087818 A1 | 4/2007 | Walker et al. | |
| 2007/0100664 A1 | 5/2007 | Seib et al. | |
| 2007/0100691 A1* | 5/2007 | Patterson | 705/14 |
| 2007/0100754 A1* | 5/2007 | Brown | 705/50 |
| 2007/0103277 A1* | 5/2007 | Yuk et al. | 340/426.35 |
| 2007/0145135 A1 | 6/2007 | Jogand-Coulomb et al. | |
| 2007/0168674 A1 | 7/2007 | Nonaka et al. | |
| 2008/0033880 A1* | 2/2008 | Fiebiger et al. | 705/44 |
| 2008/0054072 A1 | 3/2008 | Katragadda et al. | |
| 2008/0116264 A1 | 5/2008 | Hammad et al. | |
| 2008/0120214 A1* | 5/2008 | Steele et al. | 705/35 |
| 2008/0128513 A1 | 6/2008 | Hammad et al. | |
| 2008/0156873 A1 | 7/2008 | Wilhelm et al. | |
| 2008/0162295 A1 | 7/2008 | Bedier | |
| 2008/0172341 A1* | 7/2008 | Crandell | 705/75 |
| 2008/0201212 A1 | 8/2008 | Hammad et al. | |
| 2008/0203152 A1 | 8/2008 | Hammad et al. | |
| 2008/0203170 A1 | 8/2008 | Hammad et al. | |
| 2008/0208681 A1 | 8/2008 | Hammad et al. | |
| 2008/0228600 A1 | 9/2008 | Treyz et al. | |
| 2008/0230600 A1 | 9/2008 | Black et al. | |
| 2009/0171682 A1 | 7/2009 | Dixon et al. | |
| 2009/0184163 A1 | 7/2009 | Hammad et al. | |
| 2009/0239512 A1 | 9/2009 | Hammad et al. | |

FOREIGN PATENT DOCUMENTS

| | | |
|---|---|---|
| EP | 0 795 165 B1 | 9/2000 |
| GB | 2 267 626 A | 12/1993 |
| KR | 100287012 B1 | 1/2001 |
| RU | 2 222 046 C2 | 1/2004 |
| WO | 01/91485 A1 | 11/2001 |
| WO | 02/093307 A2 | 11/2002 |
| WO | 02/093307 A3 | 11/2002 |
| WO | 2004/079611 A1 | 9/2004 |
| WO | 2005/121975 A1 | 12/2005 |
| WO | 2006/124808 A1 | 11/2006 |
| WO | 2007/139302 A1 | 12/2007 |

OTHER PUBLICATIONS

Russian Office Action, with English Translation, mailed on Jun. 27, 2012 for RU Patent Application No. 2010131458, 12 pages.

"SmartTrip," version edited by Schumin Web on Sep. 4, 2005, downloaded from the internet at http://www.wikipedia.org, on Feb. 24, 2011, 4 pages.

American Public Transportation Association; "Account Linked Payment Service Concept White Paperz", downloaded from the internet at http://www.speacq.com/industry/APTA_FSP_ALPS_White_Paper.pdf ; (last modified Jan. 25, 2007), 33 pages.

Australian Office Action mailed on Oct. 4, 2011, for AU Patent Application No. 2008221392, 2 pages.

Australian Notice of Acceptance mailed on Jan. 15, 2012, for AU Patent Application No. 2008221392, 1 page.

Chinese Office Action, with English Translation, mailed on Jun. 2, 2010, for CN Patent Application No. 200780043545.9, 9 pages.

Chinese Office Action, with English Translation, mailed on Nov. 30, 2011, for CN Patent Application No. 200780043545.9, 10 pages.

Chinese Office Action, with English Translation, mailed on Mar. 1, 2012, for CN Patent Application No. 200780043545.9, 8 pages.

Definition of "Smart Card"; 2000; Collin's Dictionary of Computing; downloaded from the internet on Sep. 15, 2011; 1 page.

Definition of "Smart Card"; 2001; Hargrave's Communications Dictionary; downloaded from the internet on Sep. 15, 2011; 1 page.

Definition of "Smart Card"; 2003; Webster's New World Computer Dictionary; downloaded from the internet on Sep. 15, 2011; 1 page.

Definition of "Smart Card"; Date Unknown; Netlingo.com; downloaded from the internet on Sep. 15, 2011; 1 page.

Definition of "Smart Card"; Dictionary of Computing; 2008; downloaded from the internet on Sep. 15, 2011; 1 page.

Extended European Search Report mailed Nov. 12, 2010, for EP Patent Application No. 07843170.7, 8 pages.

Extended European Search Report mailed on Apr. 25, 2012, for EP Patent Application No. 07854911.0, 8 pages.

International Preliminary Report on Patentability mailed Jun. 18, 2009 in Application No. PCT/US2007/086342, 7 pages.

International Search Report mailed on Jul. 21, 2008, for PCT Patent Application No. PCT/US2007/086342, 1 page.

International Search Report mailed on Jul. 31, 2008, for PCT Patent Application No. PCT/US2008/055195, 1 page.

International Search Report mailed on Aug. 1, 2008, for PCT/US2008/055196, 1 page.

International Search Report mailed on Aug. 4, 2008, for PCT Patent Application No. PCT/US2008/055192, 1 page.

International Search Report mailed on Aug. 15, 2008, for PCT Patent Application No. PCT/US2007/079453, 1 page.

International Search Report mailed on Jan. 9, 2009, for PCT/US2008/083181, 1 page.

International Search Report and Written Opinion mailed Jul. 6, 2010 in SG Application No. 200902024-9, 19 pages.

Schellhorn, Gerhard; "Verification of a Formal Security Model for Multiplicative Smart Cards"; Proceedings of the European Symposium on Research in Computersecurity; Oct. 4, 2000; pp. 17-36.

Notice from the European Patent Office dated Oct. 1, 2007 concerning business methods, Official Journal EPO, Nov. 2007, p. 592-593.

Supplementary European Search Report dated Jan. 5, 2011 for European Application No. 08743584, 5 pages.

"Metrorail, Washington, D.C.", www.wikipedia.org, printed Jul. 31, 2008.

"The NYC Subway Trial/MasterCard/About the Trial", downloaded from the internet at http://www.mastercard.com/us/paypass/subway/about/subwaytrial_newsrelease_30Jan2006html on Jun. 11, 2008, pp. 1-2.

\* cited by examiner

VERIFICATION OF A PORTABLE CONSUMER DEVICE IN AN OFFLINE ENVIRONMENT

CROSS-REFERENCES TO RELATED APPLICATIONS

This application is a divisional application of U.S. patent application Ser. No. 11/680,592, filed Feb. 28, 2007, and is related to U.S. patent application Ser. No. 11/680,589 by A. Hammad et al., filed Feb. 28, 2007, U.S. Pat. No. 8,346,639, by A. Hammad et al., issued Jan. 1, 2013, U.S. Pat. No. 7,527,208, by A. Hammad et al., issued May 5, 2009, and U.S. patent application Ser. No. 11/536,296, filed Sep. 28, 2006, by A. Hammad et al., the contents of which are all hereby incorporated by reference in their entirety for all purposes.

BACKGROUND

In a conventional consumer card payment transaction, a cardholder presents a merchant with a portable consumer device such as a credit card to pay for goods or services. The processing of the transaction involves the merchant, an acquirer, a payment processing network, and a card issuer. The merchant initiates online processing and forwards an authorization request message to the acquirer, through the payment processing network, and to the issuer. The issuer verifies that the card number, transaction amount, and other information are valid and returns an authorization response message for the transaction back to the merchant. A variety of fraud prevention measures are used by issuers to guard against the unauthorized (or wrongly authorized) use of such cards.

Fraud prevention measures include a Cardholder Verification Value (CVV), which comprises a three-digit code that is stored within a magnetic stripe data (MSD) region of the card when the issuer provides the card for personalization. The issuer maintains a database of the CVV data for the issued cards and can therefore check an incoming request for authorization against the CVV data maintained at the issuer for the card in question. The issuer can safeguard the CVV data to ensure that such data is not shared outside of the issuer, thereby maintaining an increased level of security against fraud and counterfeit cards.

Under some situations, offline processing using a payment card is desirable. For example, transit fare processing from payment cards is typically conducted offline, because of transaction speed requirements at transit fare collection devices such as subway turnstiles or bus fareboxes For transit transactions, thirty to forty-five customers (passengers) are processed per minute, so there is insufficient time for the merchant (the transit system) to go online to the issuer for transaction authorization. Moreover, such transactions typically utilize some form of contactless card for payment that does not require physical contact between the card presented for payment and the transit fare collection device of the transit system. In these situations, some form of offline card authentication is desirable to prevent potential counterfeit card attacks and the potential organized fraud.

In this discussion, "contactless cards" for payment systems will include contactless "smart" cards and also contactless smart chips. A smart card is generally defined as a pocket-sized card (or other portable consumer device) that is embedded with either a microprocessor and one or more memory chips, or as one or more memory chips with non-programmable logic. The microprocessor-type smart card typically can implement certain data processing functions, such as to add, delete, or otherwise manipulate information stored in a memory location of the smart card. In contrast, the memory-chip-type card (for example, a pre-paid phone card) can only act as a file to hold data that is manipulated by the reading device to perform a predefined operation, such as debiting a charge from a pre-established balance held in the memory or secure memory. Smart cards, unlike magnetic stripe cards (such as conventional credit cards), can implement a variety of functions and contain a variety of types of information on the card. Therefore, in some applications they do not require access to remote databases for the purpose of user authentication or record keeping at the time of a transaction. A smart chip is a semiconductor device that is capable of performing most, if not all, of the functions of a smart card, but may be embedded in another device.

A contactless smart card is a smart card that incorporates a means of communicating with the card reader or terminal without the need for direct contact. Thus, such cards may effectively be "swiped" by passing them close to the card reader or terminal Such contactless smart cards typically communicate with the card reader or terminal using RF (radio-frequency) technology, wherein proximity to an antenna causes data transfer between the card and the reader or terminal Contactless smart cards have found uses in banking and other applications, as it may not be necessary to remove them from one's wallet or pocket in order to complete a transaction. Furthermore, because of the growing interest in such smart cards, standards have been developed that govern the operation and interfaces for contactless smart cards, such as the ISO 14443 standard. A variety of financial transactions, such as retail payment and transit fare collection, have adopted the ISO 14443 standard for contactless smart cards.

As noted above, an MSD area of a payment card can be used to store CVV data and the like to protect against fraudulent use in consumer transactions. In a contactless smart card, data for an additional, separate payment application, such as a transit application, might be stored in the card and might be feasible for performing offline authentication processing. The additional transit application data stored in the MSD area would require specialized readers that can detect and execute the offline-payment transit application. This would require additional effort on the part of the issuer to install and manage such applications, placing a burden on the issuer that may prevent widespread adoption of the solutions.

From the discussion above, it should be apparent that there is a need for transaction processing that can perform authorization operations in an offline transaction processing environment. Embodiments of the present invention satisfy this need.

SUMMARY

One embodiment of the invention is directed to a method of processing a transaction, in which data is received from a portable consumer device at a reader, wherein the portable consumer device stores an issuer verification value associated with an issuer and a supplemental verification value, and wherein the supplemental verification value is verified using an offline processing system. The supplemental verification value is then processed at the reader, and the transaction is authorized if the processed supplemental verification value indicates that the portable consumer device is authenticated. A contactless smart card does not require a separate application area for storing application data in connection with the offline payment processing, so that specialized card readers for reading from a separate offline application area are not required. This facilitates performing authorization operations in an offline transaction processing environment.

Another embodiment of the invention is directed to a method of providing a portable consumer device, the method comprises receiving supplemental verification value associated with an offline processing system; and storing the supplemental verification value and issuer verification value in the portable consumer device.

Another embodiment of the invention is directed to a portable consumer device comprising a base, and a computer readable medium on the base, wherein the computer readable medium comprises code for an issuer verification value and a supplemental verification value, wherein the issuer verification value is used by an issuer to verify that the portable consumer device is authentic in an on-line transaction and wherein the supplemental verification value is used to verify that the portable consumer device is authentic in an off-line transaction.

Another embodiment of the invention is directed to a reader configured to: receive data from a portable consumer device at a reader, wherein the portable consumer device stores an issuer verification value associated with an issuer and a supplemental verification value, wherein the supplemental verification value is verified using an offline processing system; process the supplemental verification value at the reader; and authorize the transaction if the processed supplemental verification value indicates that the portable consumer device is authenticated.

Other objects and advantages of the present invention will be apparent to one of ordinary skill in the art upon review of the detailed description of the present invention and the included figures.

DETAILED DESCRIPTION

Figure 1:
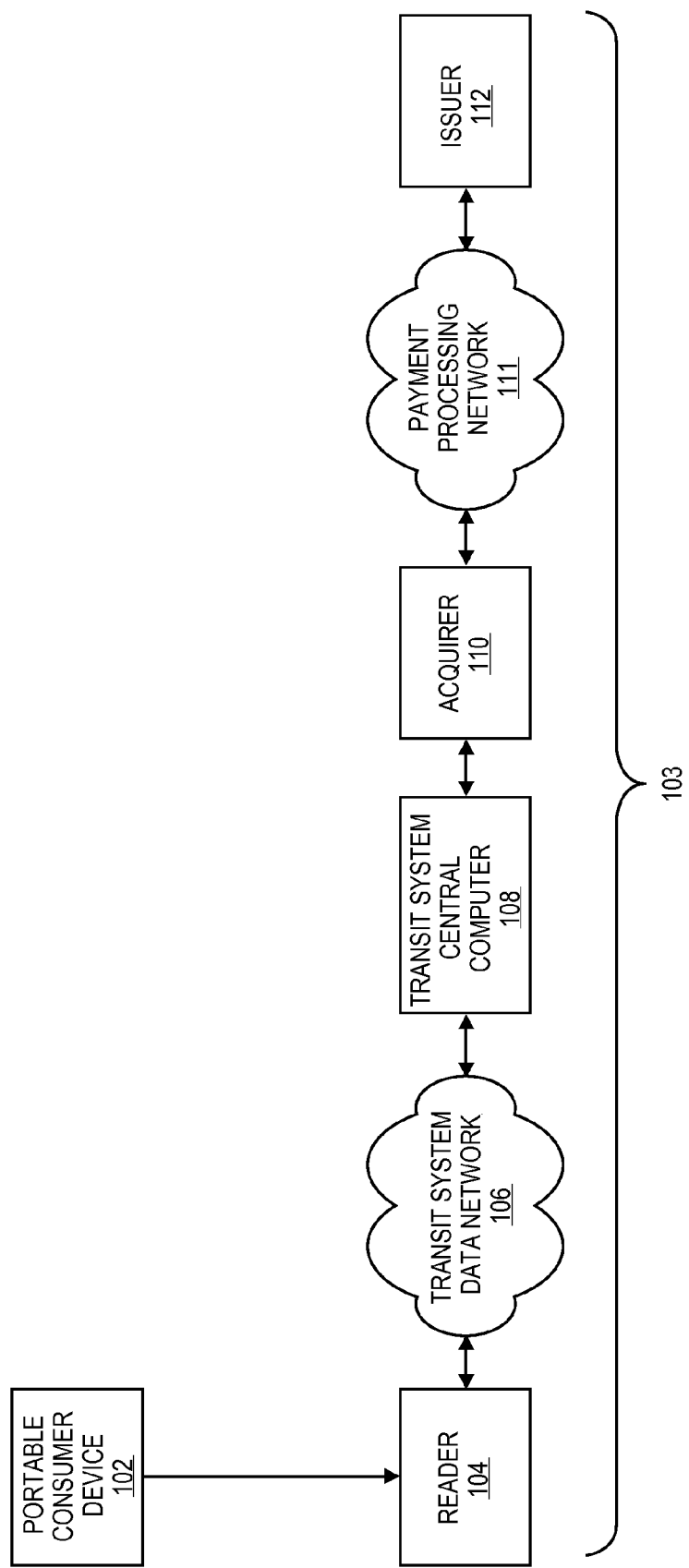
FIG. 1 is a depiction of a portable consumer device and processing system constructed in accordance with the present invention.

In embodiments of the invention, a portable consumer device (e.g., a contactless payment card or payment token device) includes a supplemental verification value that can be validated at a reader (e.g., a payment collection reader) that is offline. The supplemental verification value is preferably a transit verification value that is used in a transit environment. If the supplemental verification value is on a payment card, it may be referred to as a "supplemental card verification value." The supplemental verification value may be in the form of a multi-digit number (e.g, a three-digit number) or some other data string.

If the portable consumer device is provided as a payment card, then the supplemental verification value can be stored in a computer readable medium (e.g., a memory chip, magnetic stripe media, etc.) of the payment card, along with a conventional card verification value (which may be referred to as an "issuer verification value" in some cases), which is used for conducting typical online financial transactions. Thus, a portable consumer device according to an embodiment of the invention may include both an issuer verification value for online transactions and a supplemental verification value for offline transactions.

The issuer verification value is preferably not used for offline transactions and the supplemental verification value is not used for online transactions. In addition, the supplemental verification value as well as the issuer verification value may be static (will not change in normal operation after issuance of the portable consumer device) or may be dynamic (can change over time following issuance).

As used herein, an "online" transaction generally includes a transaction that would need an electronic authorization response from the issuer before the transaction could be conducted. An "offline" transaction is a transaction that does not require an issuer's response over an electronic communication medium before the transaction is conducted. An example of an offline transaction includes an attempt to gain access to a transit system, such as to a subway facility through a turnstile at a subway station. Another example of an offline transaction is an attempt to gain entry to a facility such as a building or venue through a closed gateway or door. A transaction may be considered "offline" if the decision as to whether or not the user may pass through the turnstile is made at the turnstile or at a computer that is proximate to the turnstile (e.g., at the same locale, such as at the same subway station), and the decision as to whether or not the user may pass through the turnstile is not made by the issuer of the portable consumer device. At some point after the user has gained access to the facility, the turnstile or the computer connected to the turnstile will communicate with the issuer so that the issuer may debit the account of the user for the entry or use of the facility.

In the context of a payment card, validation of a supplemental card verification value provides a mechanism for verification of the card authenticity at the time of use. If the card can be verified as authentic, then the potential for counterfeiting of cards for use in the offline transaction environment is reduced. This advantageously helps prevent runaway fraud. In addition, as will be explained in more detail below, the supplemental card verification value may be stored in a traditional magnetic stripe data format along with an issuer card verification value. Specialized security applications need not be stored on the portable consumer device, and can be used with conventional payment processing systems that process magnetic stripe credit card or debit card transactions. Major modifications to such systems are not needed to allow embodiments of the invention to operate. Lastly, the user of the portable consumer device benefits since the user may use the portable consumer device for both offline and online transactions.

Embodiments of the invention are described in further detail below with reference to the Figures.

FIG. 1 is a depiction of a portable consumer device 102 and a processing system 103 constructed in accordance with the present invention. Although specific components are shown in FIG. 1, systems according to embodiments of the invention may include more or less components than are shown in FIG. 1. For example, although two separate blocks are shown for the issuer 112 and the acquirer 110, it should be understood that a single organization may act as both an issuer and an acquirer in some cases.

The portable consumer device 102 according to embodiments of the invention may be in any suitable form for the processing described herein. For example, the portable consumer device can be hand-held and compact so that it can fit into a consumer's wallet and/or pocket (e.g., pocket-sized). Such portable consumer devices may include smart cards, ordinary credit or debit cards (with a magnetic strip and without a microprocessor), a token or keychain device (such as the Speedpass™ device commercially available from Exxon-Mobil Corp.), and the like. Other examples of portable consumer devices that can be constructed in accordance with the invention include consumer electronic devices such as cellular phones, personal digital assistants (PDAs), pagers, and the like. Other examples of portable consumer devices 102 include payment cards, security cards, access cards, smart media, transponders, and the like.

For purposes of illustration, embodiments of the invention are described in the context of contactless payment cards, but embodiments of the invention are not limited thereto, as noted above. Embodiments of the invention are configured for offline processing of transactions such as payment transactions, access transactions, and the like. For example, the supplemental verification value could be used for a non-financial transaction such as gaining access to a secure building or a venue where a ticket has already been prepaid. In the context of this description, the contactless card will be described in connection with readers of a transit fare collection system. Other offline systems in which the embodiments are useful include venue entrance locations, turnstiles, building entrances, vending machines, secured access areas, and the like.

In embodiments of the invention, the contactless payment card typically communicates with a reader that is part of a transit system fare collection mechanism using a short range communication method, such as a near field communications (NFC) capability. Examples of such NFC technologies include ISO standard 14443, RFID, Bluetooth™ and infrared communications methods. A contactless payment card typically comprises a base and a computer readable medium. The computer readable medium can include logic circuitry and an antenna for contactless communication. If the payment card is a smart card, then the card may include a microprocessor to perform smart card functions. The computer readable medium may be in the form of a memory chip, magnetic stripe media, and the like. Some contactless payment cards may also have both an antenna for contactless-type transactions and a magnetic stripe or electrical contacts for contact-type transactions.

Referring to FIG. 1, processing in accordance with the invention is initiated when the portable consumer device 102 is presented for use and is read by the reader 104, which may be a contactless reader at a fare collection or venue entrance point. In the case of the illustrated portable consumer device 102, the data stored on the portable consumer device includes an issuer verification value (e.g., a CVV) for use in authenticating the portable consumer device in online transactions, and includes a supplemental verification value that is used to verify the authenticity of the portable consumer device in offline transactions. The offline transactions may or may not be offline payment transactions.

The supplemental verification value is received by the reader 104 and the transaction is authorized if the processed supplemental verification value indicates that the portable consumer device 102 is authenticated. The reader operates in an offline mode, so that authentication can occur at minimal intervals, such as are needed in the transit fare collection environment and other offline operating modes. The reader 104 may also include a processor (not shown) and a computer readable medium (not shown). It may also comprise a single device, or multiple interconnected devices. In embodiments of the invention, the authentication of the portable consumer device 102 may take place solely at the reader 104. In another embodiment, the authentication of the portable consumer device 104 could even take place at the transit system central computer 108, if appropriate network communication or speed requirements are met. Generally, the authentication decision takes place at the same locale or site (e.g., the same train station, the same store, etc.) as the reader 104. In both of the above examples, however, the authentication decision in an "offline" transaction is not conducted by the issuer 112 before the user of the portable consumer device 102 is able to perform the requested transaction.

Although the reader 104 in this example is a contactless reader, it is understood that a contact-based reader (e.g., a magnetic stripe reader with a card-receiving slot) could be used in other embodiments of the invention.

In a typical transaction, the portable consumer device 102 interacts with the reader 104. The reader 104 receives magnetic stripe track data including Primary Account Number (PAN) information, expiration date, service codes, the supplemental verification value, and the like associated with the portable consumer device 102. The reader 104 (which may be considered to be a transit fare collection device in some cases) may also have any encryption keys and associated algorithms for processing the supplemental verification value on the card, and thus may authenticate the portable consumer device 102 at the time of the transaction with no online processing. If the PAN and expiry date information are validated at the reader 104 and the device is authenticated, then the user presenting the portable consumer device 102 is allowed access to conduct the transaction (e.g., pay a fare and gain entry into a transportation system).

In preferred embodiments, after the authentication of the portable consumer device 102, and after the transaction is conducted by the user of the portable consumer device 102, the reader 104 can forward the PAN information (or a proxy account number) over a transit system data network 106 to the transit central computer 108 along with the time, date, and location of the transaction. The transit central computer can perform a fare calculation based on the history of transactions for the portable consumer device 102 (which is uniquely identified by the PAN) along with the fare policy as defined by the transit agency.

Payment processing may be performed as defined by the transit agency. Payment models implemented with the card can include a variety of schemes, such as pay-as-you-go, one transaction at a time; aggregation of many transactions into an aggregated amount based on time or value; and pre-pay accounting, where a proxy account is created and is reduced by each transaction amount until a replenishment of the proxy account is required based on time or value. After the payment processing is complete, the transit agency computer 108 processes the payment total through the acquirer 110 and a payment processing network 111 (e.g., VisaNet™) for approval or decline by the issuer 112. Any of the transit system data network 106, the transit system central computer 108, the acquirer 110, the payment processing network 111, and the issuer 112, may have suitable computational apparatuses and computer readable media suitable for performing any of the functions described herein.

Figure 2:
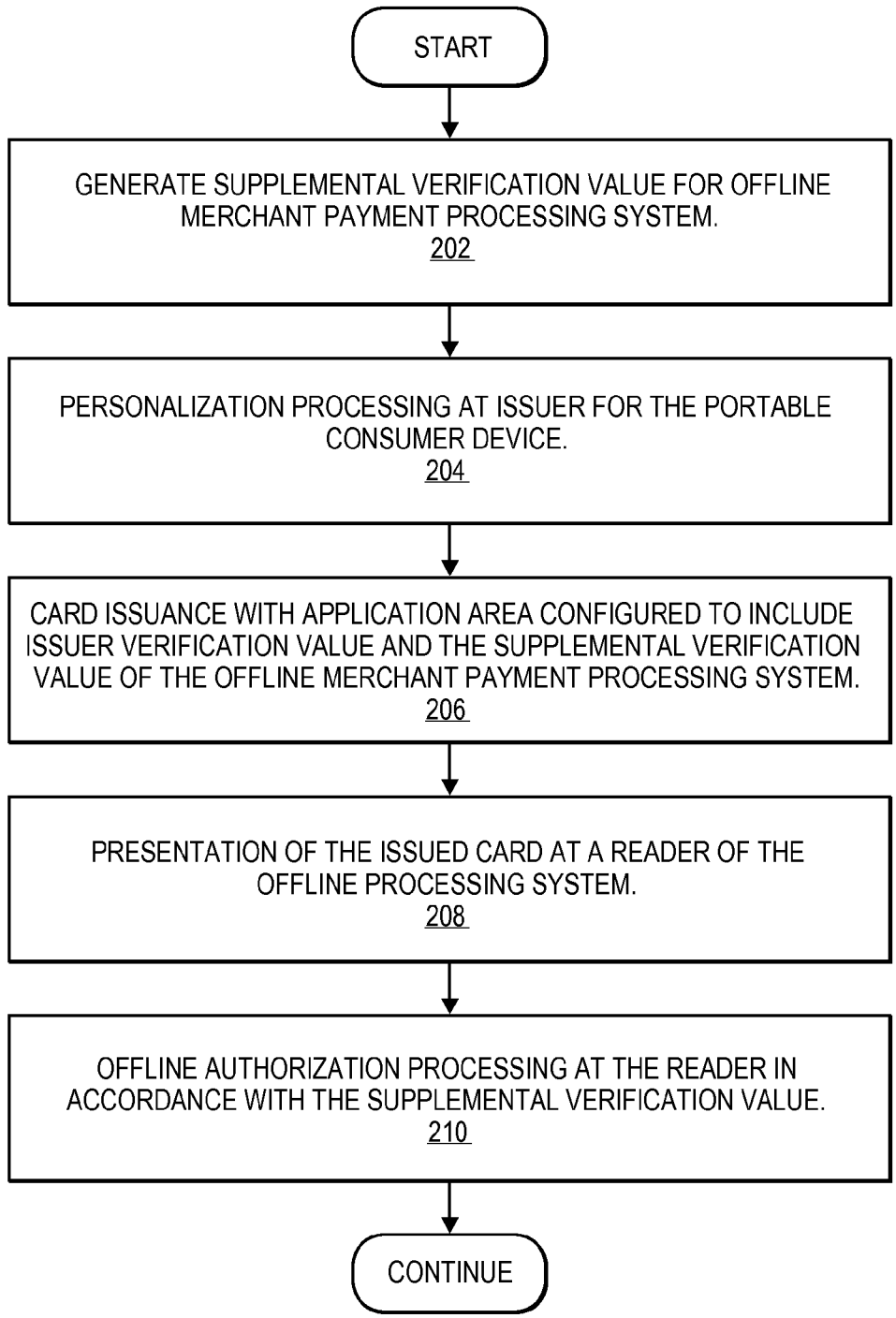
FIG. 2 is a flow diagram representation of processing in the FIG. 1 system.

FIG. 2 is a general flow diagram representation of the transaction processing that can be performed by the system shown in the FIG. 1. As noted above, the processing conducted by the system using the supplemental verification value can be performed without making any changes to the data format specifications for contactless payment using Magnetic Stripe Data (MSD) rules, such as the ISO 7813 standard. These specifications are based on the use of Track 1 and Track 2 data to deliver the cardholder data to the point of sale. The majority of payment cards used today are configured in accordance with a magnetic stripe data format for financial transaction cards. Although contactless transactions do not use a magnetic stripe, data from a contactless portable consumer device may still be considered "magnetic stripe data" because the data can be used with conventional processes and systems that process data from credit and debit cards that use magnetic stripes to store information.

The system shown in FIG. 1 system utilizes data fields of the Track 1 and Track 2 to store the supplemental verification value. Track 1 ("International Air Transport Association") stores more information than Track 2, and contains the cardholder's name as well as account number and other discretionary data. This track is sometimes used by the airlines when securing reservations with a credit card. Track 2 ("American Banking Association,") is currently most commonly used. This is the track that is read by ATMs and credit card checkers. It contains the cardholder's account, encrypted PIN, plus other discretionary data.

The portable consumer device constructed in accordance with the present invention provides a mechanism for insertion of the supplemental verification value into standard track data to be validated at the reader. Thus, the first operation represented in FIG. 2 by box 202 is to generate the supplemental verification value for offline processing.

In one embodiment, an encryption algorithm is used to create and decipher the supplemental verification value. A suitable encryption algorithm can utilize one or more encryption keys, and may be of either symmetric (e.g. DES or 3 DES) or asymmetric type (e.g. public key infrastructure). At box 204 of FIG. 2, the encryption algorithms and encryption keys associated with the supplemental verification value are generated and provided to the bank or other business institution that will personalize the card. Card personalization devices at the payment card personalization facility will load the appropriate supplemental verification value to the portable consumer device. The keys and algorithms are also sent to the reader so that the reader can decrypt the supplemental verification value when it is received.

In the illustrated embodiment, the TCVV data includes a full or partial cryptogram that could be based on a system-wide key, or unique card values and encryption keys. The use of encryption algorithms and keys may include symmetric (i.e. triple DES) or public key infrastructure (i.e. RSA). The issuer of the card places this data into the track data of the transit MSD application at the time of card personalization. In the case of public key infrastructure, additional data elements may be necessary and may be stored outside the track data and read by the transit contactless reader along with the track data during the transit fare transaction. The contactless reader or transit fare device will have the encryption keys and algorithm for the TCVV data, and may then authenticate the TCVV value at the time of the transaction. The authentication can take place in the short time interval necessary for processing in the transit and venue access environment, as described above.

In one embodiment, the supplemental verification value is placed into the standard Track 1 or Track 2 data elements within the primary MSD application. A variety of Track and Track 2 positions can be used for storing the supplemental verification value. For example, positions 25 to 29 of the Track 2 data fields that would normally indicate PIN verification information may be used for storing the supplemental verification value. In another alternative, Track 1 issuer discretionary data locations may be used for this purpose. The exact positions of the code within the track data will be standardized so that the issuer and merchant transit agency (or other entity) will know where to load or retrieve the data. Alternatively, other data elements may be located outside of the Track 1 and Track 2 data fields, such as in supplemental data fields of the portable consumer device. The supplemental verification value also may comprise data elements that are split and stored in distributed locations so that the value is partially stored in track data (Track 1, or Track 2, or both) and is partially stored outside of the track data.

The supplemental verification value is also provided to the reader, at box 206. The reader will authenticate the contactless portable consumer device at the time of use. Thus, the supplemental verification value can be used in an offline transaction authorization process.

The operation at box 206 is to actually issue the portable consumer device with the supplemental verification value. Typically, the issuer mails the contactless portable consumer device to the user. Once received and activated, the card may be used in conventional online financial transactions using the issuer verification value (e.g., CVV) that is also stored on the portable consumer device. It may also be used in an offline transaction as described herein and illustrated in FIG. 1, such as the transit fare collection processing.

In accordance with the offline authorization processing, the contactless payment card may be presented at a reader, represented by box 208. At the reader, the reader may receive information including the supplemental verification value and may receive other information such as the PAN, expiry date, service code, and the like.

After the track data is read by the transit fare collection device, at box 210, the reader will perform offline authorization processing and will utilize the supplemental verification value to determine if the portable consumer device is authentic. This provides a mechanism for authentication at the reader that provides for the ability to identify counterfeit cards that do not have the proper supplemental verification value. A transaction is authorized by the transit fare collection device if the processed supplemental verification value indicates that the portable consumer device is authentic. For example, authentication may include calculating a value at the reader as determined by appropriate keys and algorithms for the supplemental verification value read from the device, and comparing the calculated value with the value read from the card such that, if the calculated value matches an authentication or verfication value, the portable consumer device is authenticated.

Figure 3:
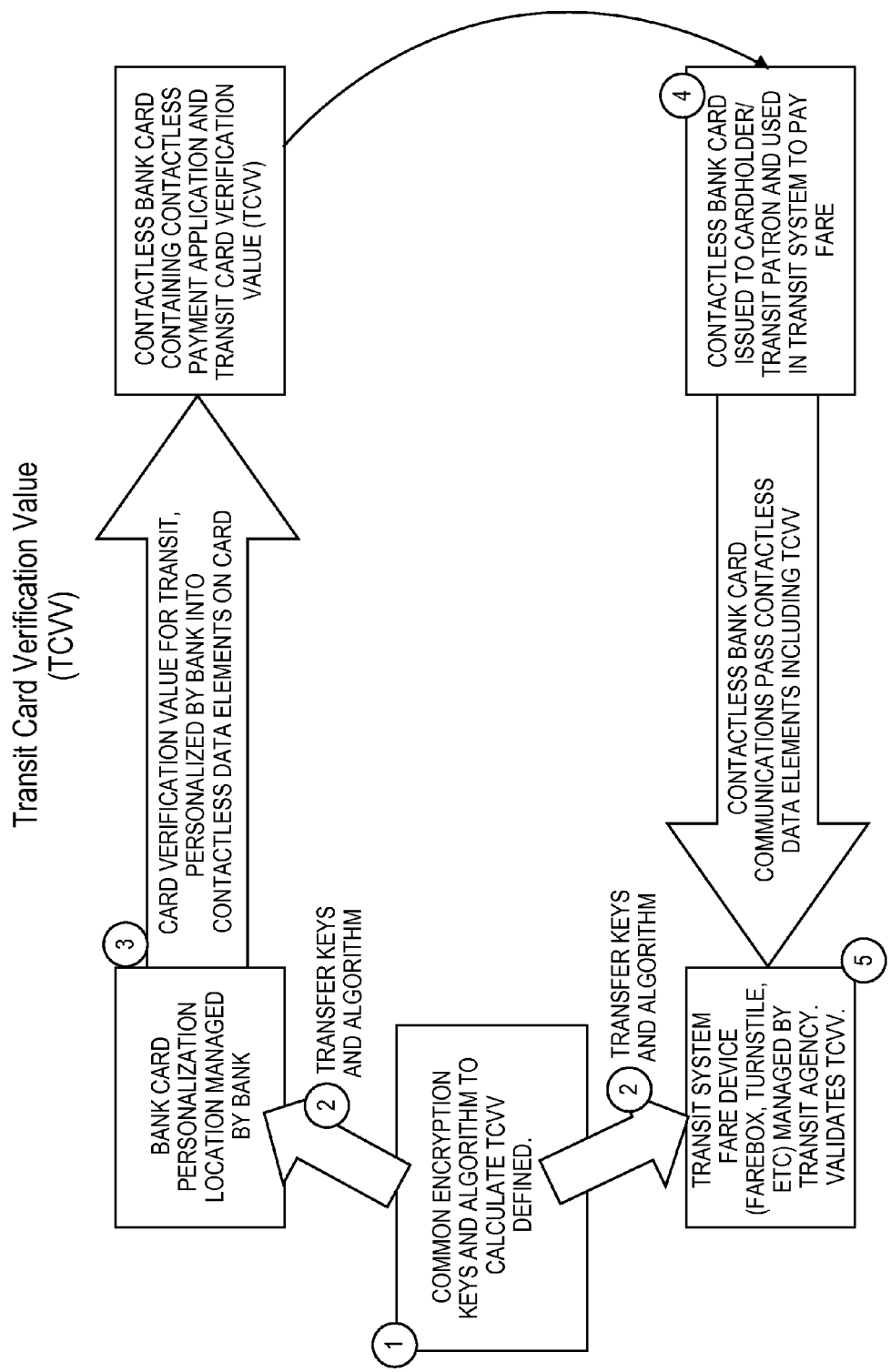
FIG. 3 is a flow diagram representation of a more specific method of processing in accordance with the present invention, using a supplemental verification value, which is a transit card verification value.

FIG. 3 is a flowchart illustrating a more specific method of processing using a supplemental verification value in accordance with the invention. In this more specific method, the portable consumer device is a contactless card configured for transit application (i.e., a transit card) and the supplemental verification value is a "transit card verification value" or TCVV.

At the FIG. 3 box numbered "1", an algorithm is determined and at box "2" is sent or provided to a bank card personalization center and to a transit system with which the transit card will be used. The algorithm is used to create and decipher a supplemental verification value that is loaded into the track data of the contactless payment card or loaded into other data components outside of the track data. The algorithm utilizes one or more encryption keys, and may be of either symmetric (i.e. DES or 3 DES) or asymmetric type (i.e. public key infrastructure). Thus, at the box "2", the keys and algorithms are transmitted to the devices at the bank that will personalize the supplemental verification value onto the card, and also to the transit fare devices that will validate the supplemental verification value at the time of use. Based on predetermined key management processes at "2", the reader will be able to identify the proper algorithms and keys to use.

At the box "3" of FIG. 3, the bank personalization system will load the appropriate supplemental verification value to the transit card based on the algorithm and keys. This data may be placed into the standard Track 1 or Track 2 data elements within the primary MSD application area, or can be placed in other data components outside of the track data, or can be placed in a combination of all. In one embodiment, positions 25 to 29 of the Track 2 data that would normally indicate PIN verification information may be used for the transit application. In another embodiment, Track 1 issuer discretionary data locations may be used for the transit application data. As noted above, the data can be outside of the track data, such as in data tags stored elsewhere, or the data can be split up and portions can be stored in multiple locations. The exact positions of the supplemental verification value within the track data or within the other data components or data tags outside of the track data will be standardized so that the issuer and transit agency will know where to load or retrieve the supplemental verification value.

At box "4" of FIG. 3, the issuer mails the card to the cardholder as normal for retail use. Once received and activated, the card may also be used in transit. The transit patron (the cardholder) may use the contactless component of the card in any transit system that is enabled to read and react to the contactless payment data, and specifically the TCVV code that has been loaded onto the card at box "3". At box "5" of FIG. 3, at the transit fare device, the card is read by the reader. The reading process reads the MSD application that provides payment track data including PAN, expiry date, service code, and so forth. In addition, the TCVV code will be included in specified data positions of the portable consumer device so it can be read. Once the verification value is read by the transit fare reader, the reader will utilize the keys and algorithm for validation of the TCVV code. That is, the supplemental verification value is processed by identifying an appropriate key and algorithm, and calculating at the reader a value corresponding to the portable consumer device, and comparing the calculated value to the supplemental verification value received from the portable consumer device. A calculated value that matches or agrees with the received value indicates authentication. This provides a mechanism for card authentication by the reader that provides the ability to detect counterfeit cards that will not have the proper TCVV value for authentication.

Figure 4:
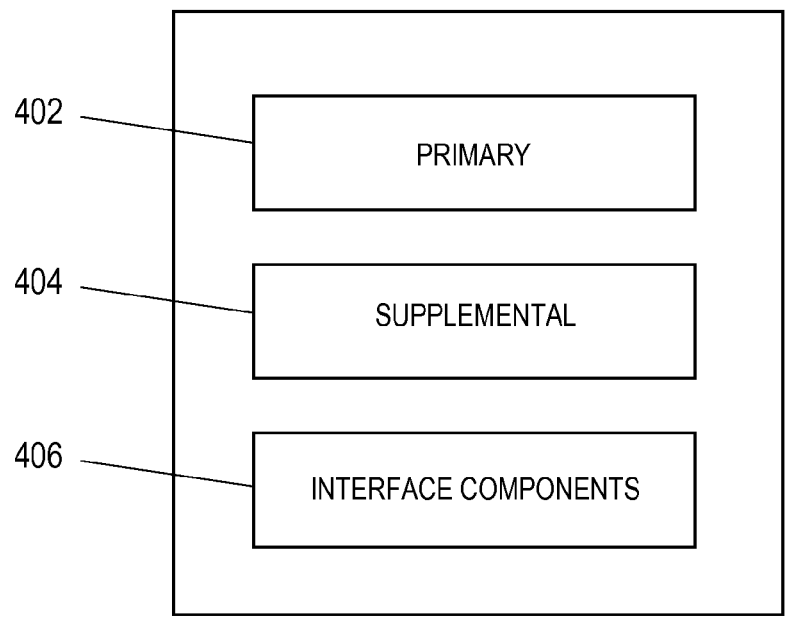
FIG. 4 is a depiction of the portable consumer device illustrated in FIG. 1.

FIG. 4 illustrates a portable consumer device 400 constructed in accordance with the present invention. The device 400 can be provided in a variety of forms. For example, the portable consumer device can be hand-held and compact so it can fit into a consumer's wallet and/or pocket (e.g., pocket-sized). Suitable portable consumer devices may include smart cards, ordinary credit or debit cards (with a magnetic strip and without a microprocessor), a keychain device (such as the Speedpass™ device commercially available from Exxon-Mobil Corp.), and the like. Other examples of portable consumer devices that can be constructed in accordance with the invention include wireless cellular telephones, personal digital assistants (PDAs), pagers, payment cards, security cards, access cards, smart media, transponders, and the like, configured for compatible operation in the processing illustrated in FIG. 1.

FIG. 4 shows that the portable consumer device 400 includes a primary (issuer) verification value 402 for online issuer verification and a supplemental verification value 404 for the offline processing described herein. The portable consumer device also includes interface processing components 406 such as processors and the like for proper functioning and data exchange. For example, a portable consumer device 400 comprising a transit smart card will include interface components that enable communication with offline readers of the transit system and will include the appropriate supplemental verification value for successful operation. A portable consumer device 400 such as a token or keychain device will include interface components for communication with the offline token/keychain reader and will include the appropriate supplemental verification value. A portable consumer device 400 such as a wireless telephone will include interface components for communication with the offline reader and will include the appropriate supplemental verification value for successful operation with the offline reader and associated processing system, along with components for the wireless telephone operation.

Figure 5:
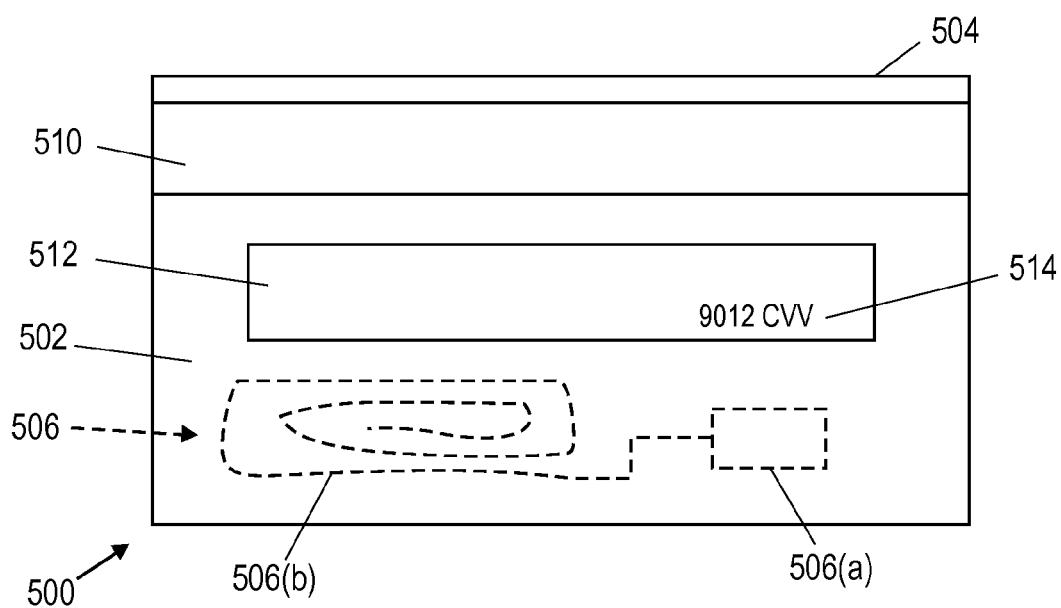
FIG. 5 is an illustration of a portable consumer device of FIG. 4 comprising a contactless smart card constructed in accordance with the invention.

FIG. 5 shows an embodiment in which the portable consumer device comprises a contactless payment smart card 500 for use in a transit system. FIG. 5 shows the reverse face 502 of the smart card 500. The smart card includes a base 504, which may be a plastic substrate. In other portable consumer devices, the base may comprise a structure such as a housing or internal circuit board, if the portable consumer device is a wireless phone or personal digital assistant (PDA) or keychain device. The card 500 includes a computer readable medium 506 comprising an interface for communication with the offline reader of the associated transit processing system. The computer readable medium 506 can comprise a processor or logic chip with memory 506(a) and an antenna element 506(b). The antenna element is generally provided in the form of a coil and may be embedded within the base 504. The antenna element 506(b) may be powered by an internal or external source to allow for the contactless transmission of data to a card reader. The memory 506(a) stores the supplemental verification value described herein and can also be used to store Track 1 and Track 2 data, and the issuer verification value associated with conventional payment systems. In FIG. 5, the memory 506(a) and antenna 506(b) are both embedded within the base 504 and therefore are illustrated in dotted line.

If desired, the reverse face 502 of the card 500 can include magnetic media or material 510 to store data for processing with a contact-type (online) reader of a payment system. Beneath the optional magnetic media 510 on the reverse face 502 is a signature block 512 on which the cardholder signature is written, and printed on the signature block is a four-digit card number value (shown as "9012" in FIG. 5) and another three-digit CVV value 514 for typical online financial transaction processing.

Figure 6:
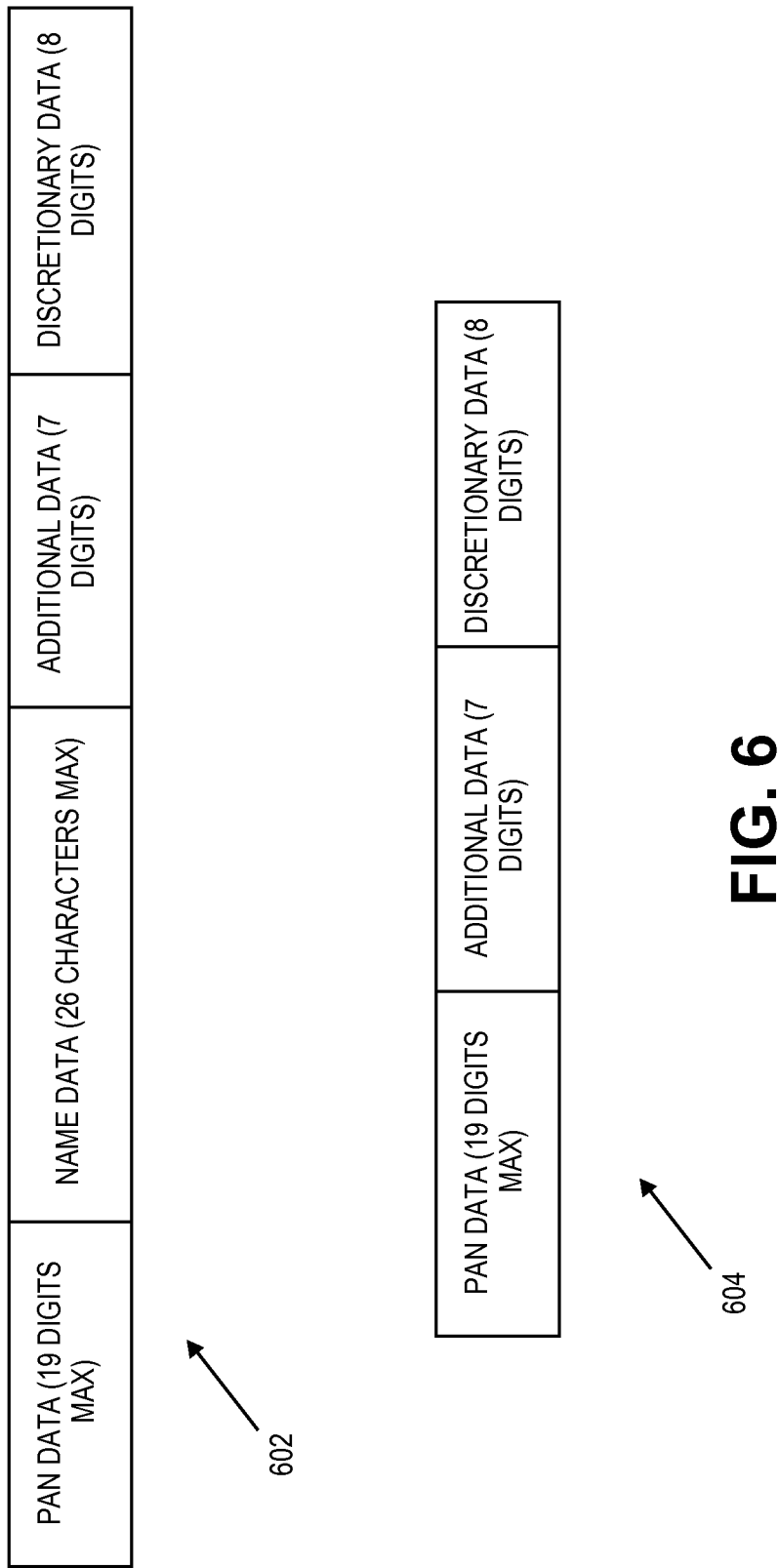
FIG. 6 is a representation of the Track 1 and Track 2 data of the FIG. 5 contactless payment card with the supplemental verification value data.

FIG. 6 is a representation of the Track 1 and Track 2 data of the contactless payment smart card illustrated in FIG. 5. Those skilled in the art will be aware of Track 1 and Track 2 data formats in accordance with the well-known magnetic stripe data (MSD) configuration. Such data may be stored in the previously described memory 506(a) of the offline system interface 506. The data can be placed on the card in accordance with financial transaction processing of the ISO 7813 standard. The Track 1 data 602 includes data fields for the Primary Account Number (PAN), comprising a maximum of nineteen digits. The Track 1 data 602 also includes a name data field of twenty-six characters, an additional data field of seven digits, and a discretionary data field of eight digits. The Track 2 data 604 includes a 19-digit PAN field, an additional data field of seven digits, and a discretionary data field of eight digits. In conventional card construction in accordance with ISO 7813, the CCV data is stored in the additional data fields. For the contactless payment card of FIG. 5 constructed in accordance with the invention, the supplemental verification value can be stored in one of the additional data fields.

Embodiments of the invention have a number of advantages. For example, in the context of a contactless payment card as described herein, offline processing can be provided without the need for configuring a second application (e.g., a transit application) on the card in addition to a conventional payment application. In this way, the potential for counterfeiting cards is removed due to the inclusion of card authentication capability with the supplemental card verification value. There is also no need for the issuer to manage a second offline application on the card, thus saving space on the card. That is, a supplementary application can be configured with the primary (e.g. retail) application data without need for a separate application. For example, if the card is used by a transit agency, the transit agency may utilize the same payment application configuration as all other merchants capable of processing contactless payments. There is no need for preregistration of the card at each transit location. Any encryption algorithms and keys or the like necessary for offline processing will have been provided to the appropriate readers. This allows any transit system user to conduct transactions at any time using standard magnetic stripe type data. In addition, common key sets for the supplemental card verification value can be used and distributed to all issuers for personalization of the card and to all agencies for such validation. Moreover, there is no need for issuer/agency pre-agreement. Standardized MSD track data can be used for both offline and online transactions.

It should be understood that certain elements of the present invention as described above can be implemented in the form of control logic using computer software in a modular or integrated manner Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of providing a portable consumer device, the method comprising:

receiving, by a processor, a supplemental verification value associated with an offline processing system;

storing the supplemental verification value and an issuer verification value in the portable consumer device, such that data from the portable consumer device concerning a transaction can be received at a reader, wherein the issuer verification value is associated with an issuer, and wherein the supplemental verification value can be verified using an offline processing system that is not in communication with the issuer such that the supplemental verification value can be processed at the reader and the transaction can be authorized if the processed supplemental verification value indicates that the portable consumer device is authenticated;

wherein the received supplemental verification value comprises data created in accordance with a cryptography system; and wherein the supplemental verification value is dynamically changed on the portable consumer device after issuance of the portable consumer device.

2. The method of claim 1, wherein the supplemental verification value is a transit verification value that is used to authenticate the portable consumer device to gain access to a transit system.

3. The method of claim 1, wherein the supplemental verification value and the issuer verification value are stored in a supplemental data field in a computer readable medium of the portable consumer device.

4. The method of claim 3, wherein the supplemental verification value is stored in track data of the portable consumer device in accordance with a magnetic stripe data (MSD) configuration.

5. The method of claim 3, wherein the supplemental verification value is stored outside of track data of the portable consumer device, wherein the track data is defined in accordance with a magnetic stripe data (MSD) configuration.

6. The method of claim 3, wherein the supplemental verification value is partially stored in track data of the portable consumer device in accordance with a magnetic stripe data (MSD) configuration and partially outside of the track data of the portable consumer device.

7. The method of claim 1, wherein the portable consumer device is a contactless portable consumer device.

8. The method of claim 1, wherein the portable consumer device is in the form of a card.

9. A portable consumer device comprising:

a base;

a computer readable medium on the base, wherein the computer readable medium stores code for an issuer verification value and a supplemental verification value, wherein the issuer verification value is used by an issuer to verify that the portable consumer device is authentic in an online transaction and wherein the supplemental verification value is used to verify that the portable consumer device is authentic in an offline transaction, such that data from the portable consumer device concerning a transaction can be received at a reader, wherein the issuer verification value is associated with an issuer, and wherein the supplemental verification value can be verified using an offline processing system that is not in communication with the issuer such that the supplemental verification value can be processed at the reader and the transaction can be authorized if the processed supplemental verification value indicates that the portable consumer device is authenticated; and wherein either the issuer verification value or the supplemental verification value can be dynamically changed in the portable consumer device.

10. The portable consumer device as defined in claim 9, wherein the portable consumer device is a card.

11. The portable consumer device as defined in claim 10, wherein the supplemental verification value is a transit verification value.

12. The portable consumer device as defined in claim 11, wherein the issuer verification value is stored in primary data of the portable consumer device and the transit verification value is stored in supplemental data of the portable consumer device.

13. The portable consumer device as defined in claim 12, wherein the supplemental verification value is stored in track data of the portable consumer device in accordance with a magnetic stripe data (MSD) configuration.

14. The portable consumer device as defined in claim 12, wherein the supplemental verification value is stored outside of track data of the portable consumer device, wherein the track data is defined in accordance with a magnetic stripe data (MSD) configuration.

15. The portable consumer device as defined in claim 12, wherein the supplemental verification value is partially stored in track data of the portable consumer device in accordance with a magnetic stripe data (MSD) configuration and partially outside of the track data of the portable consumer device.

16. The portable consumer device as defined in claim 11, wherein the supplemental verification value is stored in a data track that is compatible with a payment processing system that processes data in accordance with a magnetic stripe data (MSD) configuration.

17. The portable consumer device as defined in claim 9, wherein the portable consumer device is a contactless device.

18. The portable consumer device as defined in claim 9, wherein the issuer verification value and the supplement verification value are statically stored in the portable consumer device.

19. The portable consumer device as defined in claim 9, wherein the portable consumer device comprises a wireless telephone.

20. A method comprising:

receiving, by a server computer, an authorization request message comprising a fee calculation, wherein the authorization request message is associated with a transaction, wherein the transaction is initiated using a portable consumer device at a reader, wherein the portable consumer device stores an issuer verification value associated with an issuer and a supplemental verification value, wherein the supplement verification value is received by the reader, wherein the supplemental verification value is verified by an offline processing system that is not in communication with the issuer, wherein the supplemental verification value is processed at the reader, and wherein the transaction is authorized by the reader if the processed supplemental verification value indicates that the portable consumer device is authenticated;

sending the authorization request message to the issuer, wherein the issuer verifies transaction data is valid;

receiving an authorization response message from the issuer;

sending the authorization response message to a transit computer;

wherein the reader processes the supplemental verification value by identifying an appropriate key and algorithm, calculating a value corresponding to the portable consumer device, and comparing the calculated value to the supplemental verification value received from the portable consumer device; and wherein the supplemental verification value is dynamically changed on the portable consumer device after issuance of the portable consumer device.

21. The method of claim 20, wherein the fee calculation is performed by the transit computer, wherein the transit computer receives account information and transaction information from the reader.

22. The method of claim 20, wherein the fee calculation is determined using one of a variety of schemes including one transaction at a time, aggregation of many transactions into an aggregated amount based on time, aggregation of many transactions into an aggregated amount based on value, and a pre-paid account replenishment.

23. The method as defined in claim 20, wherein authorizing the transaction comprises permitting a user of the portable consumer device to enter a facility if the transaction is authorized.

* * * * *